(12) United States Patent
Eryurek et al.

(10) Patent No.: US 8,935,298 B2
(45) Date of Patent: Jan. 13, 2015

(54) INTEGRATED NAVIGATIONAL TREE IMPORTATION AND GENERATION IN A PROCESS PLANT

(75) Inventors: Evren Eryurek, Minneapolis, MN (US); Scott N. Hokeness, Lakeville, MN (US); Stuart Harris, Minneapolis, MN (US); Steven Dillon, White Bear Lake, MN (US); Greg Rome, Woodbury, MN (US); Jon Westbrock, Richfield, MN (US); Kadir Kavaklioglu, Eden Prairie, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1639 days.

(21) Appl. No.: 10/331,974

(22) Filed: Dec. 30, 2002

(65) Prior Publication Data

US 2004/0139079 A1    Jul. 15, 2004

(51) Int. Cl.
*G06F 17/30*      (2006.01)
*G05B 23/02*      (2006.01)

(52) U.S. Cl.
CPC ........ *G05B 23/0267* (2013.01); *G05B 23/0216* (2013.01); *G05B 2219/31467* (2013.01); *G05B 2219/36121* (2013.01)
USPC ...................................................... 707/803

(58) Field of Classification Search
CPC .. G06Q 10/10; G06Q 30/02; G06F 17/30286; G06F 17/30595; G06F 17/30067
USPC ........... 707/102, 1–3, 100, 104.1, 803, 999.1; 709/206; 705/27; 715/764, 236
See application file for complete search history.

(56) References Cited

U.S. PATENT DOCUMENTS

| 4,527,271 A | 7/1985 | Hallee et al. |
| 4,607,325 A | 8/1986 | Horn |

(Continued)

FOREIGN PATENT DOCUMENTS

| DE | 100 49 021 | 4/2002 |
| WO | WO 01/67191 | 9/2001 |

(Continued)

OTHER PUBLICATIONS

U.S. Appl. No. 10/085,439 entitled "Creation and Display of Indices within a Process Plant," filed Feb. 28, 2002.

(Continued)

*Primary Examiner* — Sheree Brown
(74) *Attorney, Agent, or Firm* — Marshall, Gerstein & Borun LLP

(57) ABSTRACT

A process plant data collection and organization system uses a common or integrated navigational tree structure to organize and enable a user to view and access information obtained from different applications or data sources within a process plant, even when those different applications have different manners of organizing or enabling users thereof to view the collected information. The integrated navigational tree may be developed from and may use the navigational tree categories of the different applications or may map the data within different categories of the navigational trees of the different applications into categories within the integrated navigational tree. The integrated navigational tree enables a user to view and access plant data collected or developed by different applications within the process plant in a single place and in an organized manner so that the user can view data related to the plant from a higher point of view than provided by any of the individual applications.

50 Claims, 14 Drawing Sheets

(56) References Cited

U.S. PATENT DOCUMENTS

| | | |
|---|---|---|
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,486,920 A | 1/1996 | Killpatrick et al. |
| 5,486,996 A | 1/1996 | Samad et al. |
| 5,488,697 A | 1/1996 | Kaemmerer et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,619,638 A | 4/1997 | Duggan et al. |
| 5,640,491 A | 6/1997 | Bhat et al. |
| 5,666,297 A | 9/1997 | Britt et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,984,502 A | 11/1999 | Calder |
| 5,988,847 A | 11/1999 | McLaughlin et al. |
| 6,005,571 A * | 12/1999 | Pachauri ........................ 715/764 |
| 6,008,985 A | 12/1999 | Lake et al. |
| 6,033,257 A | 3/2000 | Lake et al. |
| 6,041,263 A | 3/2000 | Boston et al. |
| 6,047,221 A | 4/2000 | Piche et al. |
| 6,055,483 A | 4/2000 | Lu |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,122,555 A | 9/2000 | Lu |
| 6,128,279 A | 10/2000 | O'Neil et al. |
| 6,393,427 B1 * | 5/2002 | Vu et al. ........................ 707/797 |
| 6,421,571 B1 * | 7/2002 | Spriggs et al. .................. 700/17 |
| 6,636,857 B2 | 10/2003 | Thomas et al. |
| 6,735,596 B2 * | 5/2004 | Corynen ........................ 707/102 |
| 6,754,885 B1 * | 6/2004 | Dardinski et al. ............. 717/113 |
| 6,775,576 B2 * | 8/2004 | Spriggs et al. ..................... 700/8 |
| 7,493,310 B2 * | 2/2009 | Eryurek et al. ........................ 1/1 |
| 8,620,618 B2 * | 12/2013 | Eryurek et al. ............... 702/182 |
| 2001/0009425 A1 | 7/2001 | Thomas et al. ............... 345/771 |
| 2001/0016846 A1 * | 8/2001 | Chakrabarti et al. ......... 707/102 |
| 2001/0039544 A1 * | 11/2001 | Chakrabarti et al. ............. 707/5 |
| 2002/0059195 A1 | 5/2002 | Cras et al. ........................ 707/3 |
| 2002/0077211 A1 | 6/2002 | Nixon et al. |
| 2002/0161940 A1 | 10/2002 | Eryurek et al. |
| 2003/0028268 A1 | 2/2003 | Eryurek et al. |
| 2003/0126115 A1 | 7/2003 | Solomon |
| 2003/0172371 A1 | 9/2003 | Offenmuller ................. 717/120 |
| 2003/0195934 A1 * | 10/2003 | Peterson et al. ............... 709/206 |
| 2003/0195939 A1 * | 10/2003 | Edirisooriya et al. ......... 709/212 |
| 2004/0036698 A1 * | 2/2004 | Thurner et al. ............... 345/619 |
| 2004/0139085 A1 | 7/2004 | Eryurek et al. |

FOREIGN PATENT DOCUMENTS

| | | |
|---|---|---|
| WO | WO 01/95041 | 12/2001 |
| WO | WO 02/33603 A2 | 4/2002 |
| WO | WO 02/071170 A2 | 9/2002 |

OTHER PUBLICATIONS

"GE PREDICTOR™ Services: GE PREDICTOR Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE PREDICTOR™ Services," GE Industrial Systems, available at http://www.geindustrial.com/cwc/services?id=74 on Jul. 18, 2002.

(56) References Cited

OTHER PUBLICATIONS

"Customer Benefits," GE Industrial Systems, available at http://www.geindustrial.com/cwc/services?id=75 on Jul. 18, 2002.
International Search Report for PCT/US03/28148, issued Jan. 21, 2004.
International Search Report for PCT/US03/41384, issued Jun. 3, 2004.
International Search Report for PCT/US2004/008413 mailed Sep. 6, 2004.
Written Opinion Issued in PCT/US2004/008413 mailed Sep. 6, 2004.
"Factory Monitoring via the Internet," Machine Design, 69:34 (1997).
Office Action issued in Chinese Patent Application No. 03825741.6 issued Jul. 20, 2007.

* cited by examiner

INTEGRATED NAVIGATIONAL TREE IMPORTATION AND GENERATION IN A PROCESS PLANT

FIELD OF TECHNOLOGY

This relates generally to process plant maintenance, control and viewing applications and, more particularly, to the generation and use of a common navigational tree having sections thereof associated with data from different applications in a process plant.

DESCRIPTION OF THE RELATED ART

Process plants, such as those used in chemical, petroleum or other industries, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as increasing or decreasing fluid flow and measuring process parameters. The process controller receives signals indicative of process measurements or process variables made by or associated with the field devices and/or other information pertaining to the field devices, uses this information to implement a control routine and then generates control signals which are sent over one or more of the buses or other communication lines to the field devices to control the operation of the process. Information from the field devices and the controller is typically made available to one or more applications executed by operator workstations to enable an operator to perform desired functions with respect to the process, such as viewing the current state of the process, modifying the operation of the process, etc.

While a typical process plant has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process.

As a result, many process plants, and especially those which use smart field devices, include applications that are used to help monitor and maintain the devices within the plant regardless of whether these devices are process control and instrumentation devices or are other types of devices. For example, the Asset Management Solutions (AMS) application sold by Emerson Process Management, enables communication with and stores data pertaining to field devices to ascertain and track the operating state of the field devices. An example of such a system is disclosed in U.S. Pat. No. 5,960, 214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant. In many cases, however, outside service organizations may perform services related to monitoring process performance and equipment. In these cases, the outside service organizations acquire the data they need, run typically proprietary applications to analyze the data and merely provide results and recommendations to the process plant personnel.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc.

Typically, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers, to perform the different functions. In many instances, these different tools collect or use different types of data associated with or collected from the devices or equipment within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alarms generated within the process. Still further, it is typical to provide control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit. While this information may be provided to the process control operator via standard user interface devices, the process control operators are generally interested in viewing and accessing the information within the applications based on how the process plant is set up and configured from a control standpoint.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface. None-the-less, maintenance personnel are typically interested in viewing and accessing the information from the applications available thereto based on how the equipment is set up or located in the plant, or on other logical bases related to the equipment within the plant. This organization is typically different than the control organization.

Still further, some tasks, such as monitoring equipment, testing the operation of devices, determining if the plant is running in an optimal manner, etc. are performed by outside consultants or service companies who measure the data needed, perform an analysis and then provide only the results of the analysis back to the plant personnel. In these cases, the data is typically collected and stored in a proprietary manner and may be organized in a still different manner as the organization of the data is geared to the particular application that is collecting, generating and using the data.

Many of the different applications discussed above use a navigational tree or other similar structure for organizing and enabling a user of the application to view and access the different data or information within or available to the application. In most cases, these navigational tree structures are similar in nature to the navigational tree structures used in Microsoft Outlook™, Windows™, etc., and are provided in these applications to enable a user to access or drill down into a relevant area, subarea, etc., of the plant to perform functions using the application. Usually, although not always, the applications use a navigational tree structure with nomenclature provided by the S88 standard, which logically divides a process plant into smaller and smaller entities, as, starting at the highest level, Enterprise, Site, Area, Process Cell, Unit, Equipment Module and Control Module. Applications using a navigational tree structure based on the S88 standard may provide some or all of these headings within a navigational tree to enable a user to access information or perform functions associated with the process plant.

Unfortunately, each of the different applications is generally different in the manner in which it uses and applies this navigation tree structure, including the names and, sometimes, the meaning of the names used therein. Thus, system level software applications provided for different uses within a plant, such as control applications, maintenance applications, optimization applications, power equipment monitoring applications, efficiency or plant monitoring applications, etc., may and generally do have a different way of organizing the data associated therewith. Moreover, customers may have a still different preferred manner of organizing the information pertaining to their plant, that may differ from any organization provided in any of the applications used in the plant.

Currently, plant operators, maintenance personnel, etc. must become accustomed to and remember the different manner in which the same or different information for a plant is available in and organized within the different applications used in the plant, even though, in some instances, some of the same information is stored in and used by those different applications. This makes cross use of these applications tedious and sometimes confusing. Furthermore, it makes it very difficult to organize the information provided from different applications in a single and consistent manner, or to enable a user to view the information from different sources, i.e., applications, using a single navigational tool.

However, there is currently a need by some users, such as persons responsible for business applications, like those which order parts, supplies, raw materials, or which assist in making strategic business decisions such as choosing which products to manufacture, what variables to optimize within the plant, etc., to have access to data from more than one of the applications discussed above, to thereby understand or view the operation of the plant from a higher level than provided by any of the individual applications within the plant. While, in the past, these persons have not had much access to the actual data generated within the plant by the different applications, U.S. patent application Ser. No. 10/085,439, entitled "Creation and Display of Indices within a Process Plant," filed on Feb. 28, 2002 and assigned to the assignee hereof, the disclosure of which is hereby expressly incorporated herein, discloses a method of combining the data from various different sources of data in a central database to make that data available on a more general basis to business personnel, as well as to the different users and applications within the process plant.

However, as noted above, the different applications collecting this data are designed to be used within the process plant to perform very different functions on, typically, a subset of the devices or equipment within the plant. The applications are, therefore, developed to organize the data collected and generated thereby in sometimes slightly different and in sometimes very different manners. As a result, while these applications can share data with one another and with a centralized database, there is no simple technique of organizing the shared data in a manner that makes sense or is easy to use by a person viewing or accessing all of the data from the different applications.

SUMMARY

A process plant data collection and organization system uses a common or integrated navigational tree structure to organize and enable a user to view and access information obtained from different applications or data sources within a process plant, even when those different applications have different manners of organizing or enabling users thereof to view the collected information. This integrated navigational tree may be developed from and may use the navigational tree categories of the different applications or may map the data within different categories of the navigational trees of the different applications into categories within the integrated navigational tree. The integrated navigational tree enables a user to view and access plant data collected or developed by different applications within the process plant in a single place and in an organized manner so that the user can view data related to the plant from a higher point of view than provided by any of the individual applications.

DETAILED DESCRIPTION

Figure 1:
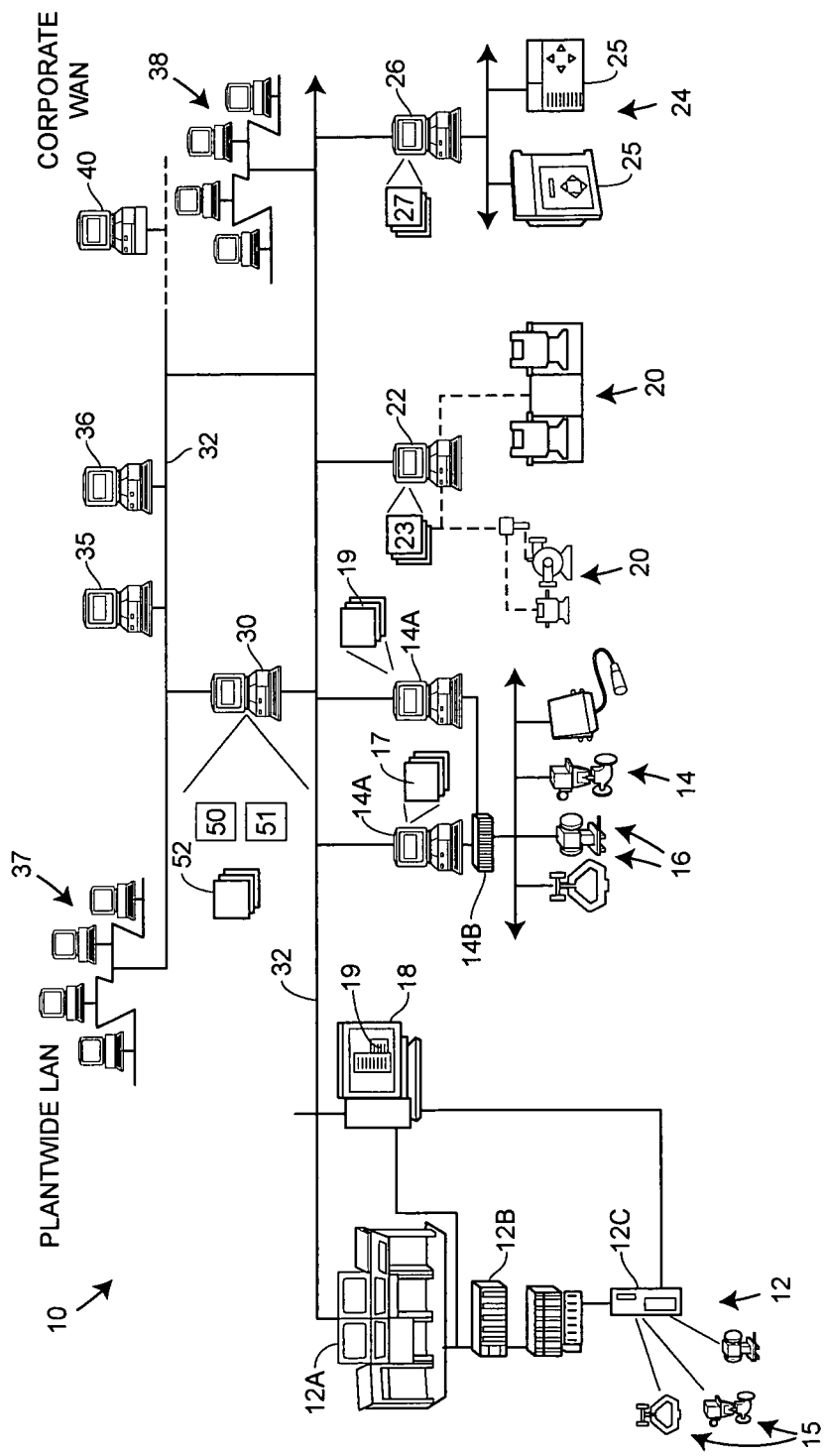
FIG. 1 is a block diagram of a process plant having an asset optimization database configured to receive and store data from many functional areas or applications within the process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or may be a DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute applications 17 available to the process control operator for controlling the operation of the process including, for example, control optimizers, diagnostic experts, neural networks, tuners, etc. Additional control applications 17 may be stored in and executed by the controllers 12B and 14B if so desired and, in some cases, within field devices 16.

Still further, maintenance systems 18, such as computers executing the AMS application or any other device monitoring and communication applications 19 may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications 19 such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. In many cases, outside consultants or service organizations may use service applications that temporary acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

A computer system 30 is communicatively connected to the computers or interfaces associated with the various functional systems within the plant 10, including the process control functions 12 and 14, the maintenance functions such as those implemented in the computers 18, 14A, 22 and 26 and the business functions. If desired, this communication interconnection may be implemented using a web interface or communication structure of any kind, including any local area network (LAN), wide area network (WAN), the internet, etc. In any event, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a communication network 32 which may use any desired or appropriate LAN or WAN protocol to provide communications. This communication network or connection may be permanent or temporary (intermittent) as desired.

As illustrated in FIG. 1, the computer 30 is also connected via the same or a different communication network 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the communication network 32, to a plantwide LAN 37, a corporate WAN 38 as well as to a computer system 40 that enables remote monitoring of or communication with the plant 10 from remote locations. The computer system 30, or any other computer connected to the communication network 32 may include a configuration application and a configuration database that generates and stores configuration data pertaining to the configuration of the process plant 10 and the devices and elements within the process plant 10.

In one embodiment, the communications over the communication network 32 occur using the XML protocol. Here, data from each of the computers 12A, 18, 14A, 22, 26, 35, 36, etc. is wrapped in an WL wrapper and is sent to an XML data server which may be located in, for example, the computer 30. Because XML is a descriptive language, the server can process any type of data. At the server, if necessary, the data is encapsulated with to a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 (which may be a server) stores and executes an asset optimization database 50 that collects data and other information generated by, for example, the process control systems 12 and 14, the maintenance systems 18, 22 and 26 and the business systems 35 and 36 as well as information generated by data analysis tools executed in each of these systems and stores this data in a database. The asset optimization database may include an expert engine 51 that may be based on, for example, based on the OZ expert system currently provided by NEXUS, or any other type of expert system including, for example, any type of data mining system. The asset optimization expert 51 operates to analyze and distribute data as necessary within the asset optimization database 50.

In the past, the various process control systems 12 and 14 and the power generating and maintenance systems 22 and 26 have not been interconnected with each other in a manner that enables them to share data generated in or collected by each of these systems in a useful manner. As a result, the manner in which the different applications 17, 19, 23, 27, etc. organize and enable a user to view data differs from application to application. However, in the plant 10 of FIG. 1, the applications 17, 19, 23, 27, etc. are now communicatively connected through and share data with the asset optimization database 50. None-the-less each of the applications 17, 19, 23, 27, etc. still typically provides or organizes the data collected or generated thereby in a different manner using a different organizational or navigational tree. To enable a consistent manner of viewing this data from the different applications, the asset optimization database 50 includes one or more navigational tree applications and databases 52 which use an integrated navigational tree structure to organize the data received from the different applications within the process plant 10 to allow a user to view or access that data in a consistent manner using a single navigational tree.

In particular, the navigational tree applications 52 provide an automated manner of generating a navigational tree to be used in, for example, a web environment by all the users of the system, to view and access the data within the asset optimization database 50, even though that data comes from different sources and is organized in the different sources in different manners. In effect, the navigational tree applications 52, in conjunction with the asset optimization database 50, provide a higher level integration platform, in this case in the form of an asset optimization server, which receives and organizes information from multiple information sources (e.g., control applications, maintenance applications, equipment monitoring applications, efficiency monitoring applications, etc.) even though each of the different information sources have a different manner of organizing the data provided thereby.

Figure 2:
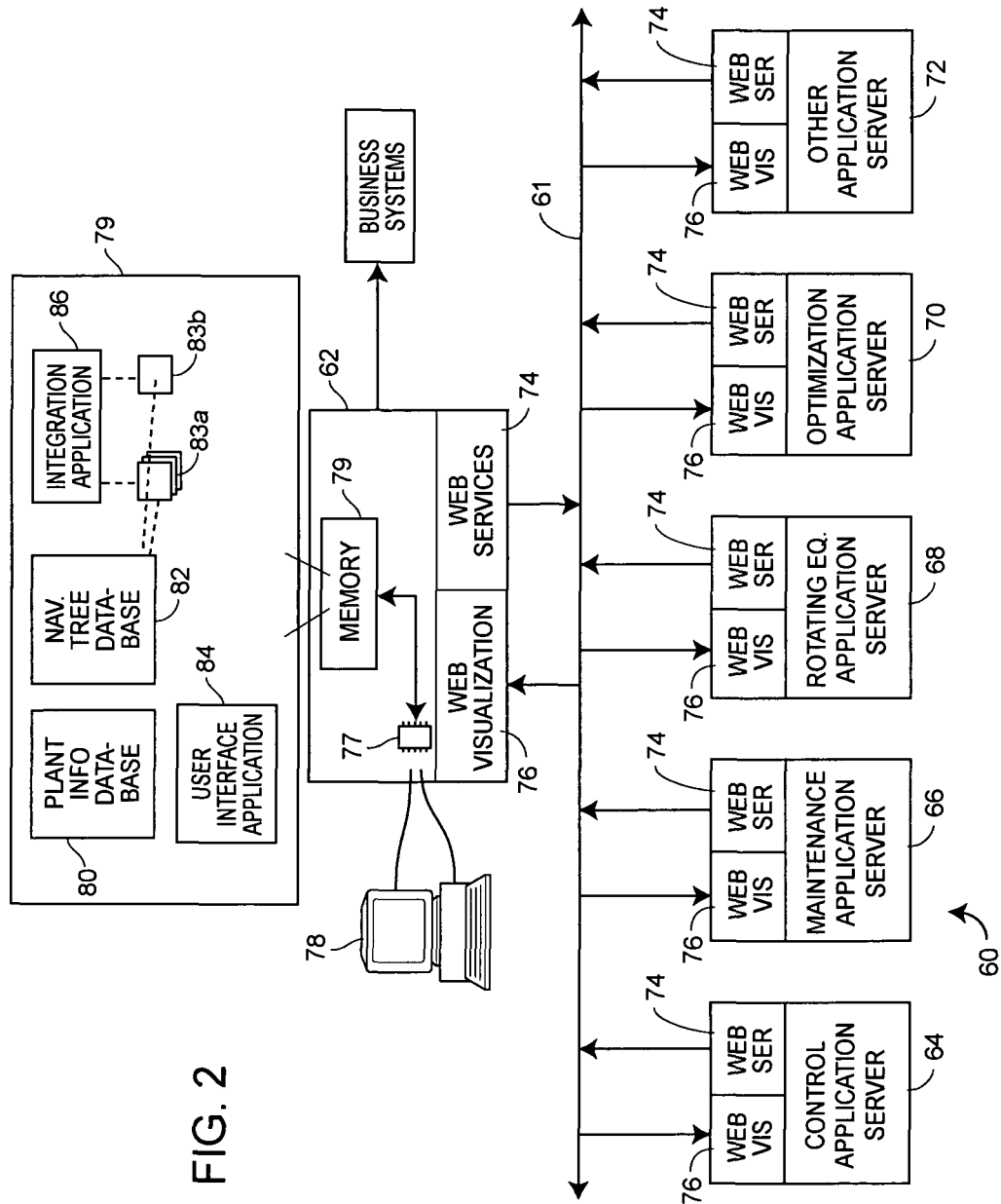
FIG. 2 is a block diagram of a data network within the process plant of FIG. 1 which may be used to provide data from many different applications within the process plant to an asset optimization database.

FIG. 2 illustrates a block diagram view of a set of applications 60 within a process plant communicatively interconnected via a web connection 61 with an asset optimization server 62 (which may be the computer 30 of FIG. 1) in a manner in which the asset optimization server 62 provides a consistent and integrated organizational and navigational tree structure with respect to the data generated in or collected by the different applications 60. In particular, a control application server 64, a maintenance application server 66, a rotating equipment application server 68, an optimization application server 70, and an additional server 72 for other applications are communicatively connected to the asset optimization server 62 via a communication network 61. Of course, any other types and number of applications could be connected in the system of FIG. 2. The communication network 61 may be any desired communication network such as a web network. Each of the servers 62-72 includes any desired web services application 74 and web visualization application 76 which, as in known, enable communications over the web connection 61 and visualization of that information to a user interface. Generally speaking, the different applications 60 run on or connected to the different servers 64-72 use different data organization and navigation structures such as different navigational trees. Still further, the asset optimization server 62 may be communicatively coupled to business system applications or any other applications via a web connection or any other desired communication network.

As illustrated in FIG. 2, the asset optimization server 62 includes a microprocessor 77, a user interface 78 and a memory 79 which stores a number of applications and databases which operate to integrate both plant data from the different applications 60 as well as navigational tree structures associated with the applications 60 into an integrated navigational tree structure. In one embodiment, the asset optimization server 62 includes a plant information database 80 which stores data from the different data source applications 60 communicatively connected to the asset optimization database server 62 and a navigational tree database 82 which stores navigational trees 83*a* associated with each of the different applications 60, as well as an integrated navigational tree 83*b* which incorporates or integrates the navigational trees of the different applications 60. The asset optimization server 62 further includes a user interface application 84 which provides information to the user via the user interface 78 pertaining to the data stored in the plant information database 80 using the integrated navigational tree 83*b*.

Still further, a data integration application 86 is provided to integrate the data from the different applications 60 into the plant information database 80 using the integrated navigational tree 83*b* and, in some cases, may provide the user with the ability to map the navigational tree structures 83*a* for the applications 60 into the integrated navigational tree structure 83*b*. In one embodiment, the integration application 86 may include a default navigational tree structure which may be used to integrate the data within each of the navigational tree structures of the applications 60. This default navigational tree structure may be based on, for example, the plant hierarchy used in the S88 standard. However, the integration application 86 may enable a user or different users to create additional navigational tree structures which may be used to integrate the navigational trees of the different applications 60 in different manner. Of course, if desired, the default navigational tree structure may be created by a user using the data integration application 86 and or the user interface application 84.

Generally, the asset optimization server 62 stores each of the different navigational tree structures 83*a* of the different applications 60 and relates or maps the data within these navigational trees to a single integrated navigational tree structure 83*b* which may be used to view and access the data within the asset optimization database 80. After the mapping is specified or complete, the data associated with each of the different tree structures of the different applications is organized within the integrated navigational tree for viewing by any user, including users of the applications at the servers 62-72 or any other users who have access to the server 62, such as business systems users. If desired, a single navigational tree structure may be used by, for example, a configuration application and this single navigational tree structure may be accessed and used by every user in the process plant or enterprise system associated with the process plant so that each user views the data from the plant in the same manner. If desired, each user may access the single navigational tree structure over the web or any other communication network that connects the different users to the configuration application.

During operation, the different applications 60 may send their respective navigational tree structures used in these applications to the asset optimization server 62 where these tree structures may be stored in the database 82. The integration application 86 may automatically identify a correspondence between the different categories of a navigational tree associated with one of the applications and the categories of the integrated tree structure 83*b*. In some cases, a user may manually specify a correspondence between categories of the navigational tree of the particular application 60 and categories within the integrated or default navigational tree 83*b*. If the categories of the application 60 are known to correspond in some manner to some standard, such as the S88 standard, the integration application 86 may identify this correspondence automatically. On the other hand, a user may create a user preferred navigational tree and identify the correspondence between the different categories of the navigational tree of one of the applications 60 and the user created integrated navigational tree. Of course, it will be understood that the default or integrated navigational tree structure may include categories not represented or present in certain ones of the applications sending data thereto because the data flow is from the applications 60 to the server 62. However, the default or integrated navigational tree should have a category or level that is or can be associated with each of the categories of the navigational trees of the different applications 60.

Of course, the integration application 86 provides mapping between the navigational trees of each of the applications 60 (which are sending data to the asset optimization server 62) and the integrated navigational tree 83*b* and may perform this mapping when, for example, an application is brought on-line or is otherwise integrated within the asset optimization functions of the process plant 10. Thereafter, each of the applications 60 provides data to the server 62 along with enough information to enable the server 62 to categorize this data according the navigational tree structure of the application 60 which sends the data. The server 62 and, in particular, the integration application 86 may store the data as being associated with the proper navigation tree category or categories of the integrated navigational tree structure 83*b* being used to provide an integrated view. Of course, the data itself is stored in the plant information database 80 for future access. Thereafter, the user interface application 84 may enable a user or operator to access the integrated navigational tree 83*b* having the data from the different applications referenced thereby to gain access to the data stored in the plant information database 80 in a consistent and integrated manner.

In one embodiment, the integrated navigational tree 83*b* may be organized according to logical areas, such in instrumentation, mechanical, and performance areas, or in physical areas, such as areas of the plant. Of course, any other desired organization can be used within the integrated navigational tree 83*b*. When the integrated navigational tree 83*b* is constructed according to logical units, the different data from the different applications (which typically falls within different logical groupings) may be separated into different sub-headings or categories under the tree, with those subheadings or categories either being standard navigational tree headings or mimicking the actual navigational tree structure associated with the different applications. In one embodiment, each of the information servers 64-72 serves its plant tree and the components thereof (including headings) to the requesting application (i.e., the asset optimization server 62). The integration application 86 then uses the obtained information to merge the various plant tree components. If desired, components of the original navigational tree of an application can be tracked by the original information server (e.g., the maintenance server 64, etc.) and if any changes take place, the asset optimization server 62 may be updated using push technology. Alternatively, the asset optimization server 62 can periodically poll the servers 64-72 to receive and keep track of the changes made in the navigational trees of those servers (or the applications run on or associated with those servers). In this manner, data that is added to, deleted from or changed within the applications 60 is mirrored or sent to the asset optimization server 62 and stored therein. Furthermore, the reflection or depiction of the devices or other entities within navigational tree of these applications is sent to the asset optimization server 62 and reflected in or mapped to the integrated navigational tree 83b so that data is now available and viewable by a user of the asset optimization database 50 via the integrated navigational tree 83b.

Figure 3:
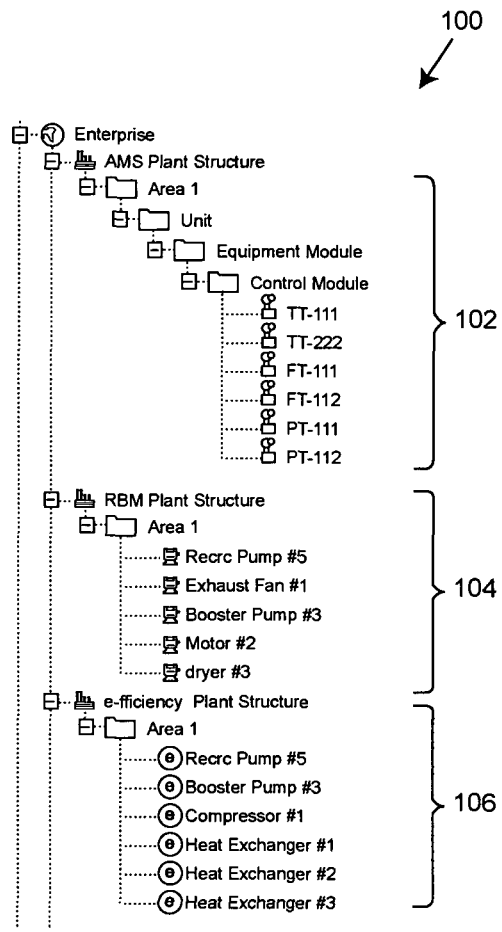
FIG. 3 is a first example screen display illustrating a first navigational tree structure used to integrate data from different applications or data sources in the process plant of FIG. 1.

FIG. 3 illustrates an integrated navigational tree 100 constructed to provide access to and viewing of data from three different applications, namely, a maintenance application (AMS), a power equipment monitoring and diagnostic application (RBM) and a plant efficiency monitoring application (e-fficiency) configured according to the source of the data. It will be noted that the integrated navigational tree 100 includes categories for categorizing the application data from each of the data source applications 60 and indications of the entities within the process plant associated with those categories.

As can be seen, the integrated navigational tree 100 includes a high-level category for each of the different applications (the applications 60 of FIG. 2) directly under the Enterprise (or top level) and sub-categories of data under these high-level categories that are dependent on and, in fact, that mirror the navigational trees of each of the different applications 60. Thus, a folder entitled AMS Plant Structure and the folders or categories 102 thereunder are associated with data from the maintenance or (AMS) application. Likewise, a folder entitled RBM Plant Structure and the folders or categories 104 thereunder are associated with data from the power equipment monitoring or (RBM) application. Still further, a folder entitled e-fficiency Plant Structure and the folders or categories 106 thereunder are associated with data from the efficiency monitoring (e-fficiency) application. Of course, more folders and subsections could be provided in the navigational tree 100 to reflect data from other applications, such as control applications, rotating equipment monitoring applications, etc.

In FIG. 3, each of the subsections 102, 104 and 106 have sub-folders or items configured in a hierarchy the reflects the hierarchy of the navigational tree of the applications from which the data originated. Thus, the subsection 102 includes folders for Areas (Area 1 is shown), Units, Equipment Modules, and Control Modules because the maintenance application (the AMS application) uses a navigational tree structure with these categories. Furthermore, the data received from the maintenance applications is placed into the sub-categories in the subsection 102 as it is organized within the actual maintenance application. For example, the Control Modules (TT-111, TT-222, etc.) for which data exists are illustrated under the Control Module folder in the subsection 102.

Similarly, the data associated with the power equipment monitoring is illustrated using the navigational tree structure of the related application, which only includes area designations under which the devices (such as pumps, fans, motors and dryers) are located. As a result, each of the pieces of power equipment for which data is collected in the plant by the power equipment monitoring application is depicted in the subsection 104 under Area 1. Likewise, because the efficiency application does not use a navigational tree with the S88 hierarchy categories, the pumps, compressors, heat exchangers, etc. being monitored by this application are merely depicted under the general folder labeled e-fficiency Plant Structure 106 as being related to the logical function of efficiency monitoring. It will be noted that the same equipment, such as Pump #3 may be monitored by different applications and thus be depicted multiple times in the integrated navigational tree structure 100. Furthermore, the same or different data (such as different data collected or generated by different applications) for the same device or other plant entity may be accessible in different locations of the integrated navigational tree 100. Of course, it will be understood that there may be other entities or folders associated with each of the subsections 102, 104 and 106 if other devices are recognized and monitored by the applications associated with these sections. Thus, the actual data, such as device depictions, within any of the subsections 102, 104 and 106 is dependent on the devices or other entities being monitored by the actual applications. Furthermore, the type of data about these devices that may be accessible via the navigational tree 100 is also dependent on the data collected or generated about these devices by the actual applications 60.

Figure 4:
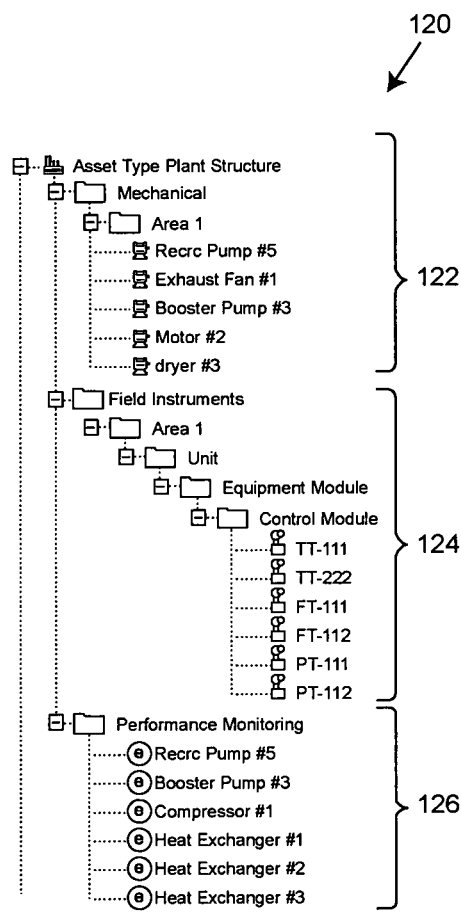
FIG. 4 is a second example screen display illustrating a second navigational tree structure used to integrate data from different applications or data sources in the process plant of FIG. 1.

FIG. 4 illustrates another example integrated navigational tree 120 which may be created automatically by the integration application 86 from each of the navigational tree structures of the different applications sending data to the asset optimization server 62. In this case, the data from the different applications is organized into logical areas such as mechanical equipment 122, field instruments 124 and performance monitoring equipment 126. The data from the different applications pertaining to these different sub-areas is mapped into that sub-area using, for example, a default S88 hierarchy or the hierarchy of the applications from which the data originates. Thus, for example, the mechanical data, which is generally received from the power equipment monitoring application, is mapped using the hierarchy of that application, while the field instrumentation equipment 124 is mapped using the hierarchy of the maintenance or control applications which provide this data which, in this case, happens to be the S88 hierarchy. Likewise, the efficiency data is mapped according to the efficiency application hierarchy. Of course, in this case, the data from different applications may be merged to some extent under the different logical or equipment based headings. Thus, data from control and maintenance applications, such as data related to valves, transmitters, etc. measured by both the control and the maintenance applications may be integrated under the field instrumentation equipment category 124 and the subcategories associated therewith.

Figure 5:
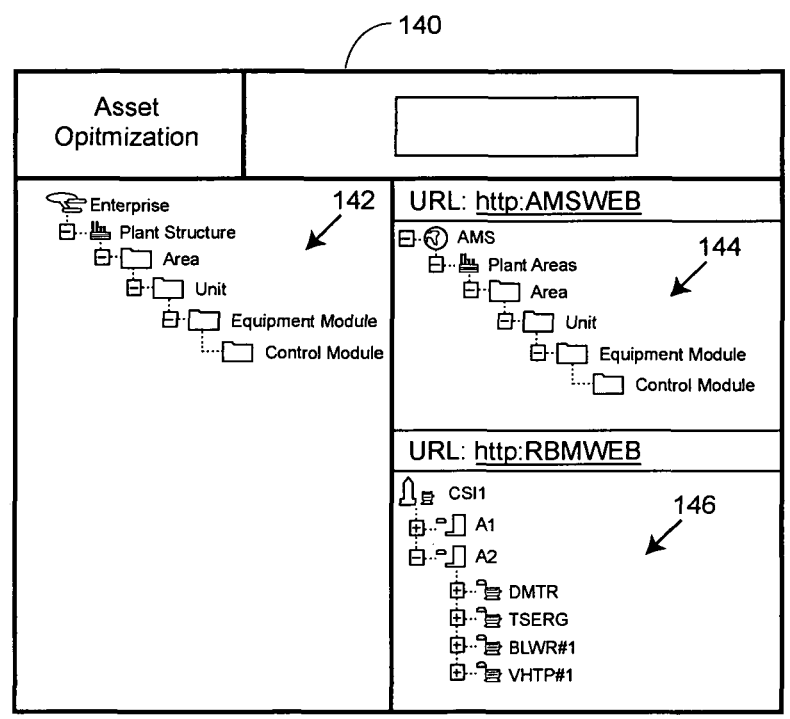
FIG. 5 is an example screen display produced by a mapping tool associated with the asset optimization database that enables an operator to manually specify mapping of navigational tree structures associated with different data sources into an integrated navigational tree associated with the asset optimization database.

As noted above, the integration application 86 may be used to create a mapping methodology between the integrated navigational tree 83b and the navigational trees 83a of each of the different applications 60. The integration application 86 may perform this mapping automatically or may enable a user to specify the mapping between different components of the navigational trees 83a of the applications 60 and the integrated navigational tree 83b. FIG. 5 illustrates an example screen display 140 that may be presented by the integration application 86 to a user to enable the user to specify a particular type of mapping for each of the different applications that provide data to the asset optimization server 62.

The left-hand side of the screen display 140 of FIG. 5 includes a depiction of the integrated navigational tree 142 used by the asset optimization server 62 to enable access to the data from different data sources. It will be noted that this integrated navigational tree 142 uses categories defined by the S88 standard. However, if desired, the user could specify other categories or a different hierarchy for the integrated navigational tree using any desired method, such as renaming the depictions of the folders provided in the tree 142, adding new folders, deleting folders, etc. The right-hand side of the screen display 140 includes depictions of the navigational tree structures associated with and, if necessary, obtained from the different applications within the plant 10. It will be noted that these navigational trees may include depictions of general categories as well as depictions of process entities, such as devices. In FIG. 5, a navigational tree structure 144 for the maintenance application (the AMS application) and a navigational tree structure 146 for a power equipment monitoring application (RBM) are illustrated. Interestingly, the navigational tree 144 of the maintenance application uses the categories of the S88 standard while the navigational tree 146 of the power equipment monitoring application does not.

In any event, a user may map components of a navigational tree, such as the tree 144, onto the integrated navigational tree 142 by selecting a particular depiction of a component of the tree 144 and dragging it over and dropping it onto the depiction of the component of the tree 142 to which it is to be mapped. Upon doing this, the integration application 86 associates the selected element and any sub-element of the tree 144 which is being dragged with the portion of the integrated tree 142 over which it is dropped. Of course, the user may provide any desired mapping and is not limited to placing, for example, the areas of the maintenance tree 144 onto the areas of the integrated tree 142. Likewise, the user can map the components of the power equipment monitoring tree 144 onto any of the components of the integrated tree 142. Upon selecting or specifying a particular mapping, the integration application 86 stores an indication of the mapping and uses that mapping to integrate data from the application into the database 80 and to enable viewing of that data via the integrated navigational tree 142.

Figure 6:
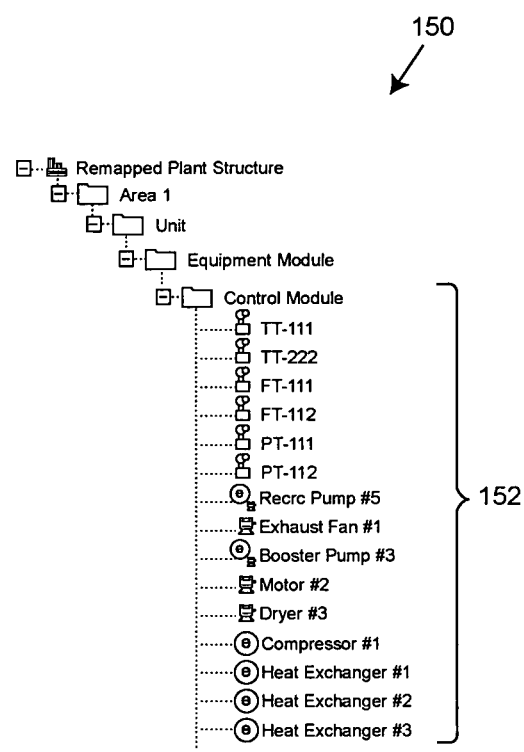
FIG. 6 is a third example screen display illustrating a third navigational tree structure created and used to integrate data from different applications or data sources in the process plant of FIG. 1.

FIG. 6 illustrates an example integrated tree 150 that may be created by the integration application 86, either automatically or upon a user using the screen display 140 of FIG. 5 to specify the manner of integrating data from the different navigational trees of the different applications 60. As illustrated in FIG. 6, a control module portion or branch 152 of the navigational tree 150 includes devices or other elements from each of a number of different applications including the valves (TT-111, TT-222, etc.) from a maintenance application; fans, pumps, motors, dryers (Recrec Pump #5, Exhaust Fan #1, etc.) from a power equipment monitoring application; and compressors and heat exchangers (Compressor #1, Heat Exchanger #1, etc.) from a plant efficiency monitoring application. Of course, other plant entities from the different applications may be organized together under different sections or sub-sections of the integrated tree 150, such as the areas of the different applications under the Areas section, etc. Of course, a screen similar to the screen 140 of FIG. 5 could have been used to specify that the device data associated with each of these different applications should be integrated together under the control module section of the three 150. Similarly, a screen similar to the screen 140 could be used to indicate that area data from different applications may be integrated together under the area designation of the integrated tree 150, etc.

Figure 7:
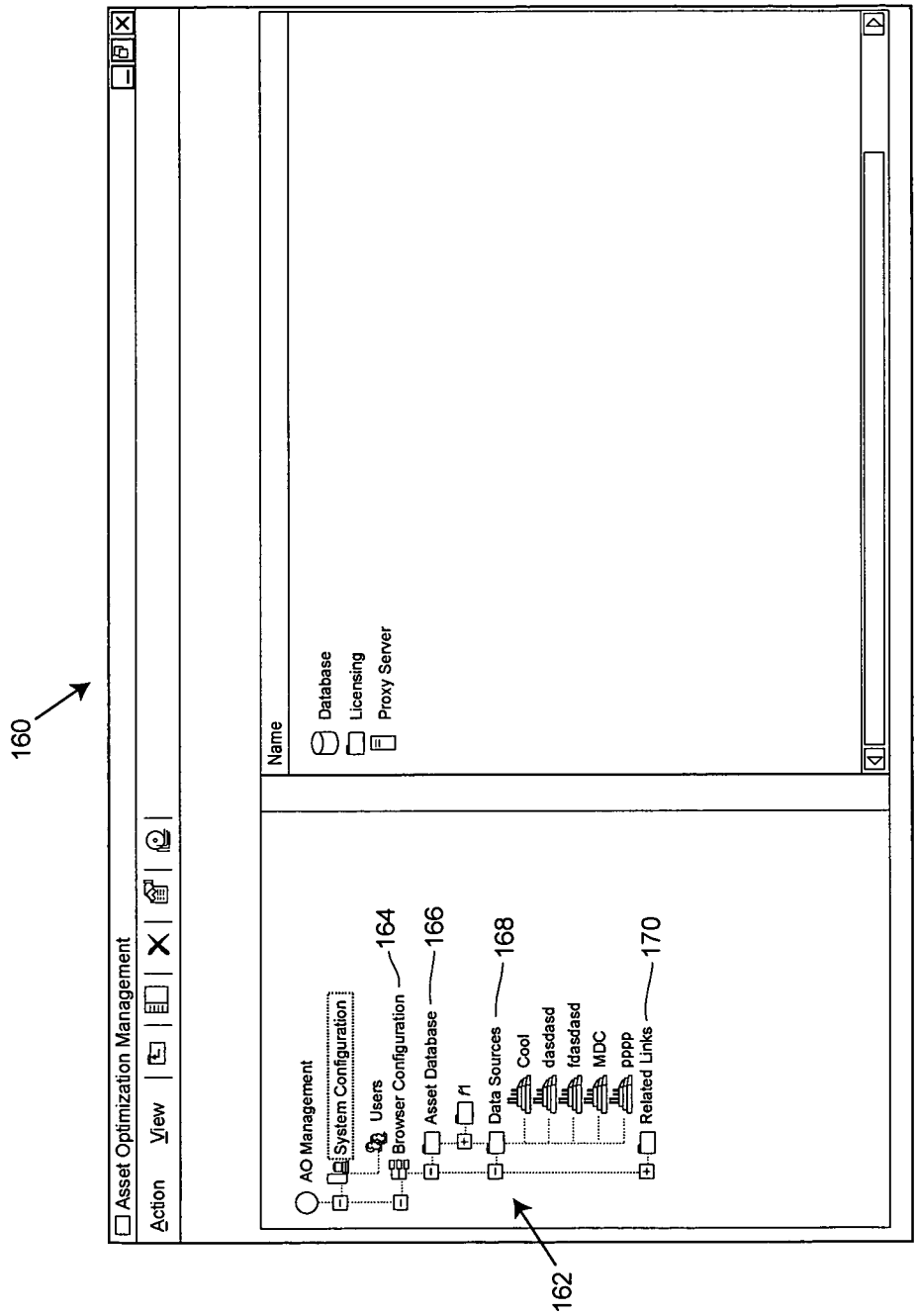
FIG. 7 is a fourth example screen display illustrating a fourth navigational tree structure that provides access to data from different sources and that includes linking information.
Figure 8:
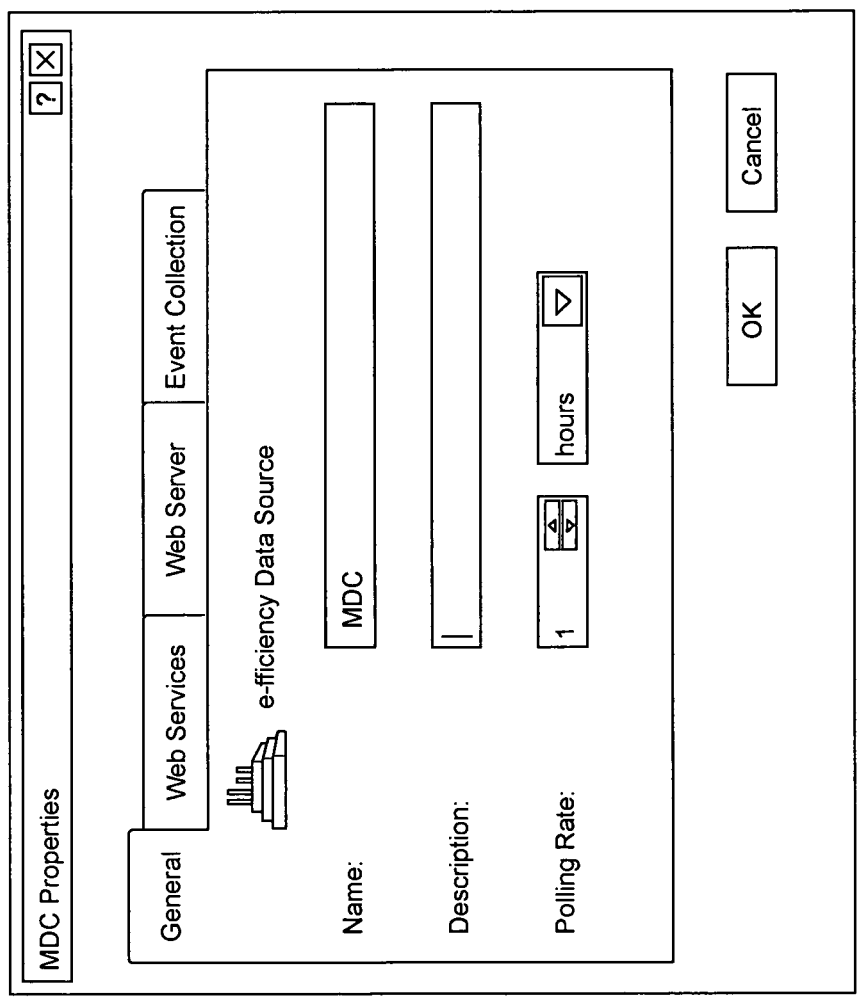
FIG. 8 is a first properties screen display associated with one of the data sources of FIG. 7.

FIG. 7 illustrates a further screen display 160 having an integrated navigational tree 162 that may be created by the integration application 86 to integrate data from the different applications 60, and which is accessible via a web communication network. The navigational tree 162 may be associated with or created by a configuration system that makes the data therein available to multiple users of the system via web browsers. The example navigational tree 162 includes a browser configuration section 164 having an asset database folder 166, a data sources folder 168 and a related links folder 170. The asset database folder 166 may store or include data pertaining to one or more assets within the process plant, while the data sources folder 168 may include and store data collected from different data sources within the process plant. The data sources to which the configuration tree 162 of FIG. 7 has access are entitled "Cool," "dasdasd," "fdasdasd," "MDC" and "pppp." The asset database folder 166 and the data sources folder 168 may collect data from different applications or assets as described above with respect to FIG. 2 and provide that data in different sub-folders in a manner that makes that data available to users having access to the configuration screen display 160 via, for example, a web connection.

The related links folder 170 may store links, such as web links, to other applications, documentation or systems associated with any of the data or assets within the process plant or associated with any of the data or assets for which data is stored or collected by the navigational tree 162. In particular, the related links folder 170 may store links placed therein by users of the system to enable easy access to other data, other applications, documentation, etc. that may be related in some manner to the data or other information stored in or accessible through the navigational tree 162. Of course, any authorized user or configuration expert may provide links in the navigational tree 162 and these links may be added or deleted at any time.

Figure 9:
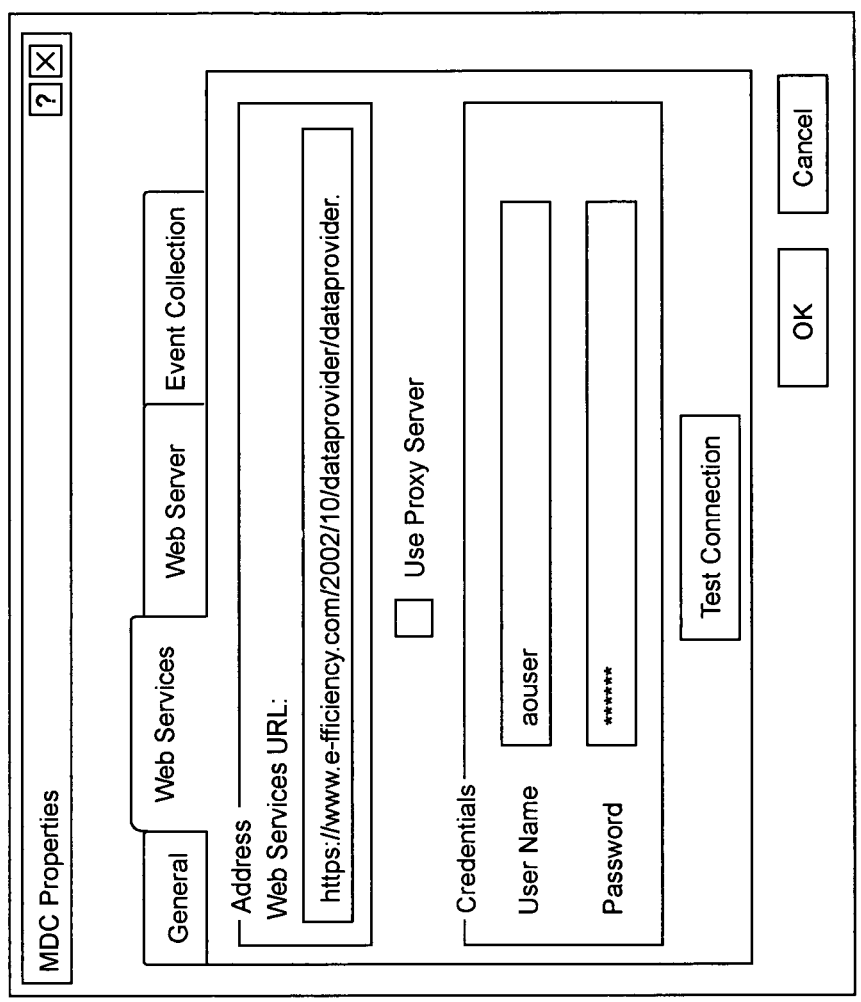
FIG. 9 is a second properties screen display associated with one of the data sources of FIG. 7.

Of course, when setting up the navigational tree 162 to collect data from different data sources, a user may specify numerous types of data to be collected from the data sources and the amount and frequency of data to be collected from these sources. As an example, FIGS. 8-11 illustrate different properties views associated with the MDC data source of FIG. 7. In the properties view of FIG. 8, the MDC data source may be named and may be provided with a description and an indication of the polling rate for that data source. The polling rate specifies the rate at which data is to be collected from this data source and this polling rate may be different for each different data source to which the navigational tree 162 is connected. The properties view of FIG. 9 provides the web address of the MDC data source which is to be used by the navigational tree application to collect data from the MDC data source. This properties view may also provide an authorized user identification and an appropriate password that is to be used by the navigational tree application to access the data source to obtain information from that data source.

Figure 10:
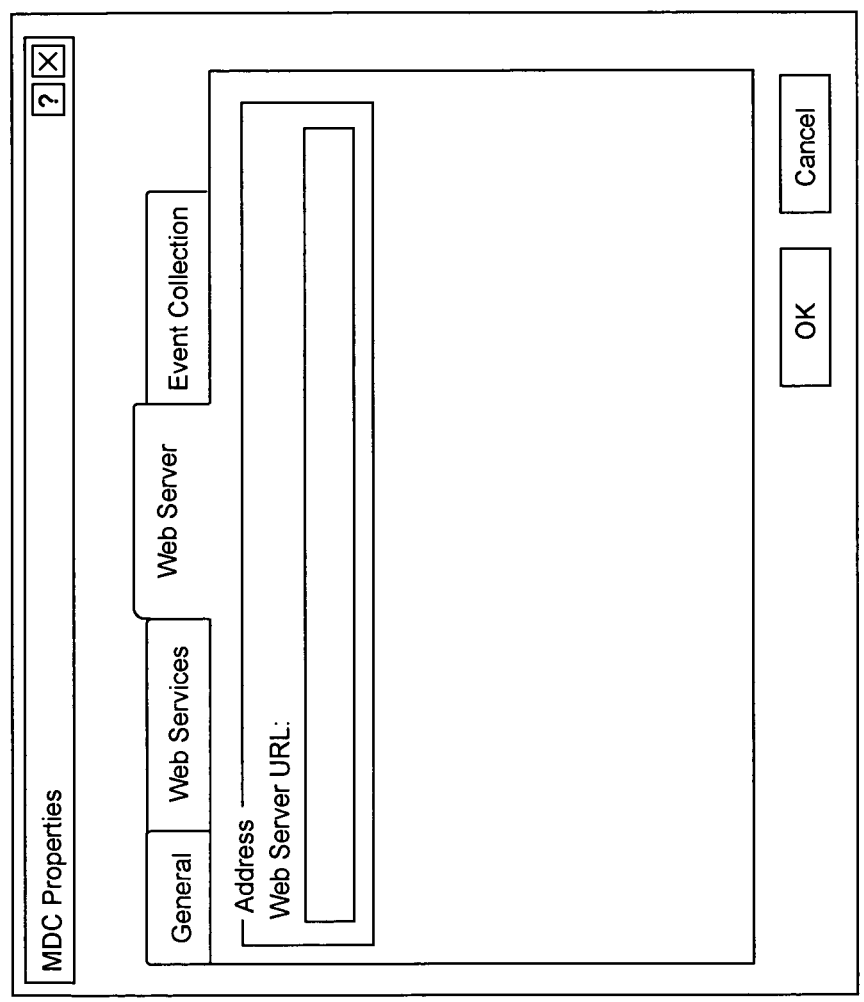
FIG. 10 is a third properties screen display associated with one of the data sources of FIG. 7.
Figure 11:
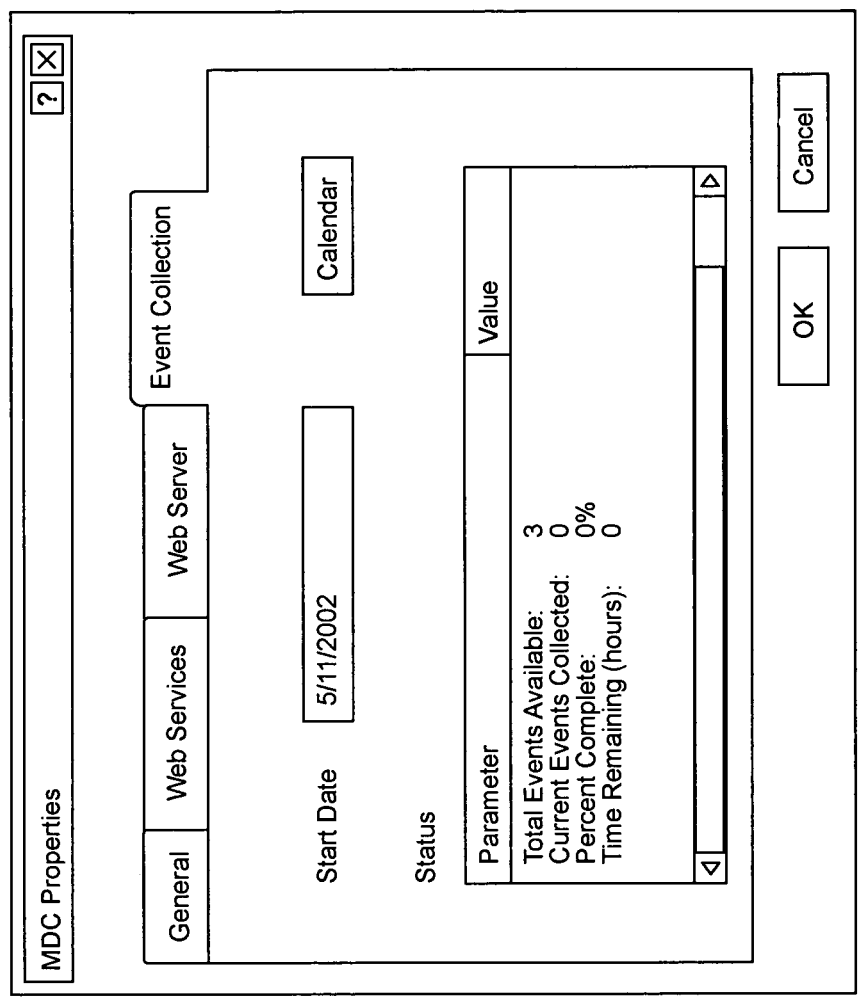
FIG. 11 is a fourth properties screen display associated with one of the data sources of FIG. 7.

The properties view of FIG. 10 may specify a web server universal resource locator (URL) or address to be used, if that is necessary, and the properties view of FIG. 11 may provide or specify the event collection configuration for the MDC data source. In the case illustrated in FIG. 11, the start date of the collection and parameter or statistical data pertaining to the events collected from this data source are specified. Of course, other event data or statistics could be collected as well and provided in this or other properties view.

Figure 12:
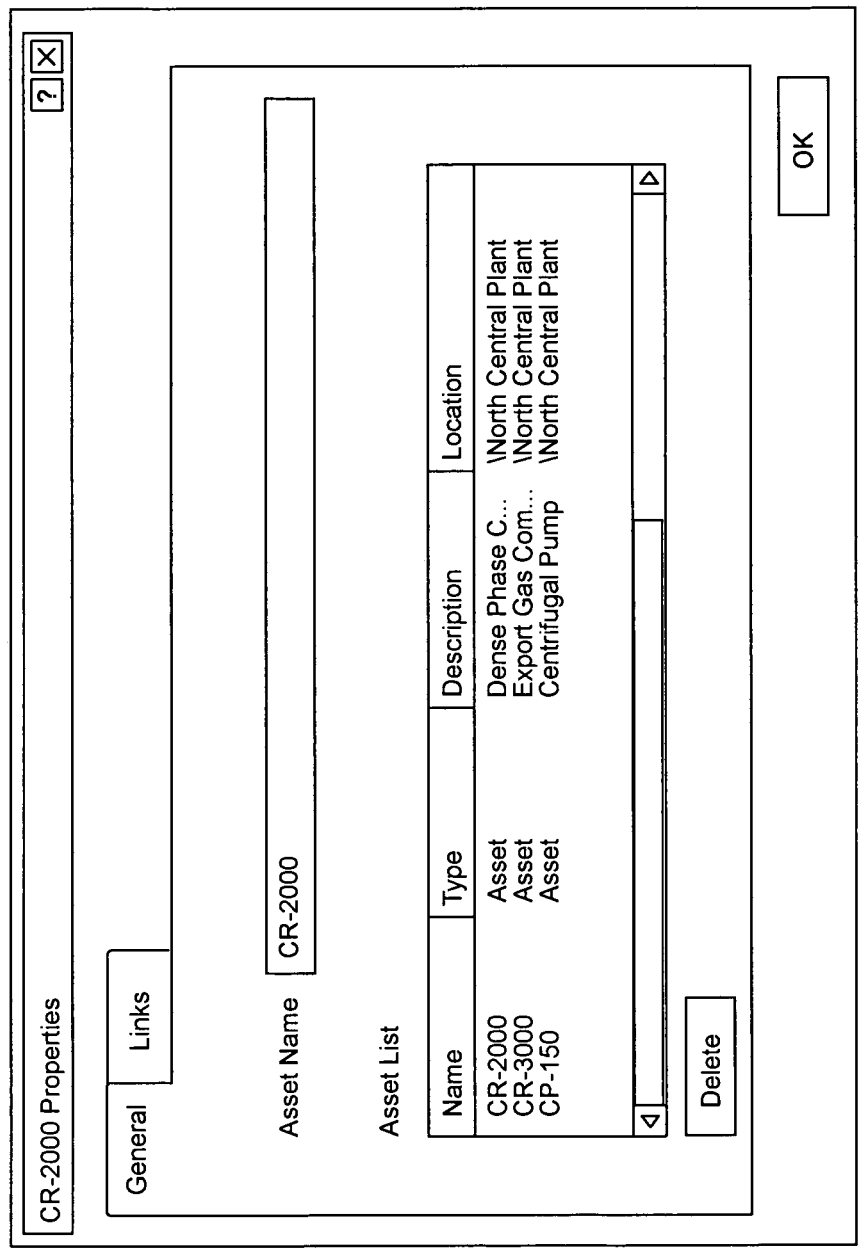
FIG. 12 is a first properties screen display associated with an asset within the navigational tree structure of FIG. 7.
Figure 13:
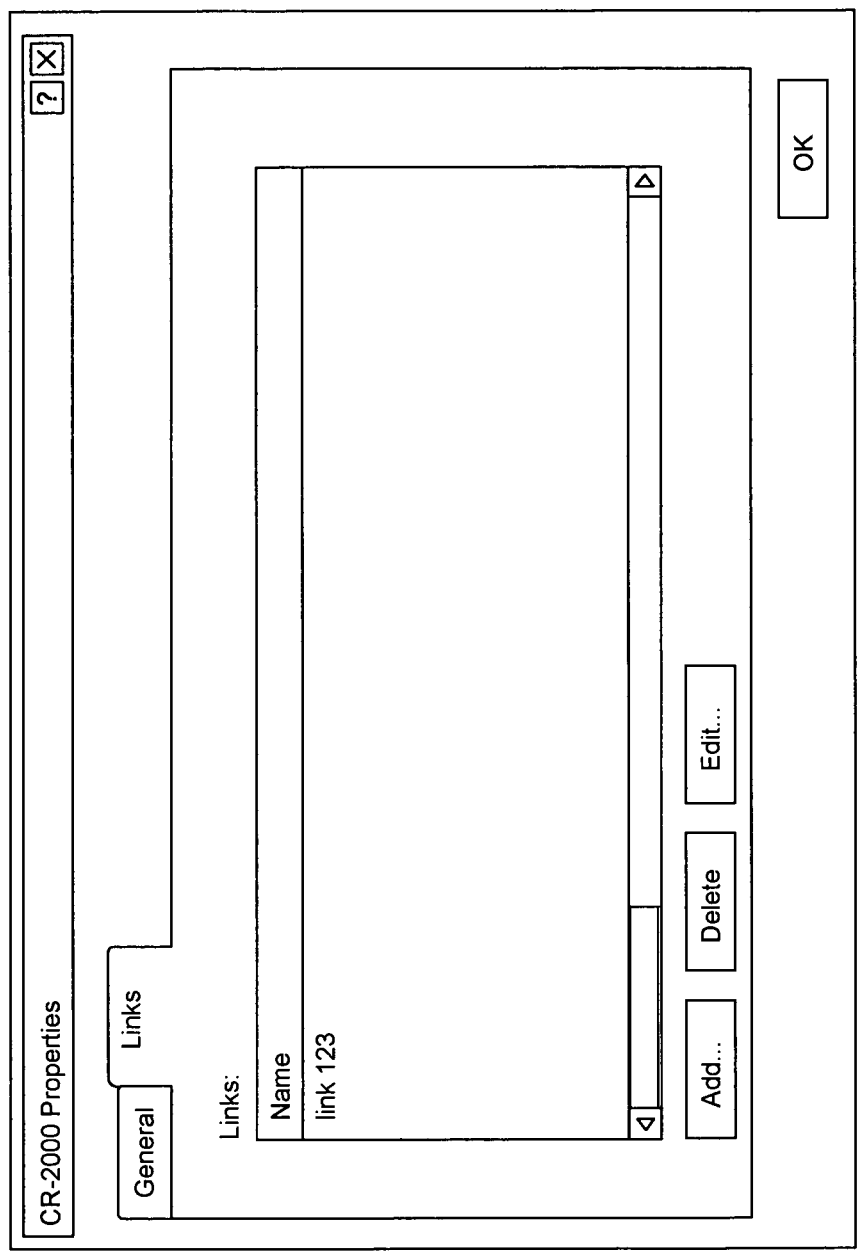
FIG. 13 is a second properties screen display associated with an asset within the navigational tree structure of FIG. 7.

FIG. 12 illustrates a properties view or display that is provided for and associated with one of the assets for which data is stored in the asset folder 166 of FIG. 7. In this case, the different assets are listed (including the assets CR-2000, CR-3000 and CP-150) along with a description of and location information for those assets. Further information may be accessed about an asset using the asset name field in FIG. 12. Links associated with the asset in the asset name field of FIG. 12 may be specified or accessed via the properties display of FIG. 13. In this case, the link "link 123" is specified as being associated with the CR-2000 asset. Of course, this link ("link 123") may be any type of link specification, including a URL in a web environment or any other desired type of link, and is stored in the related links folder 170 of FIG. 7.

Figure 14:
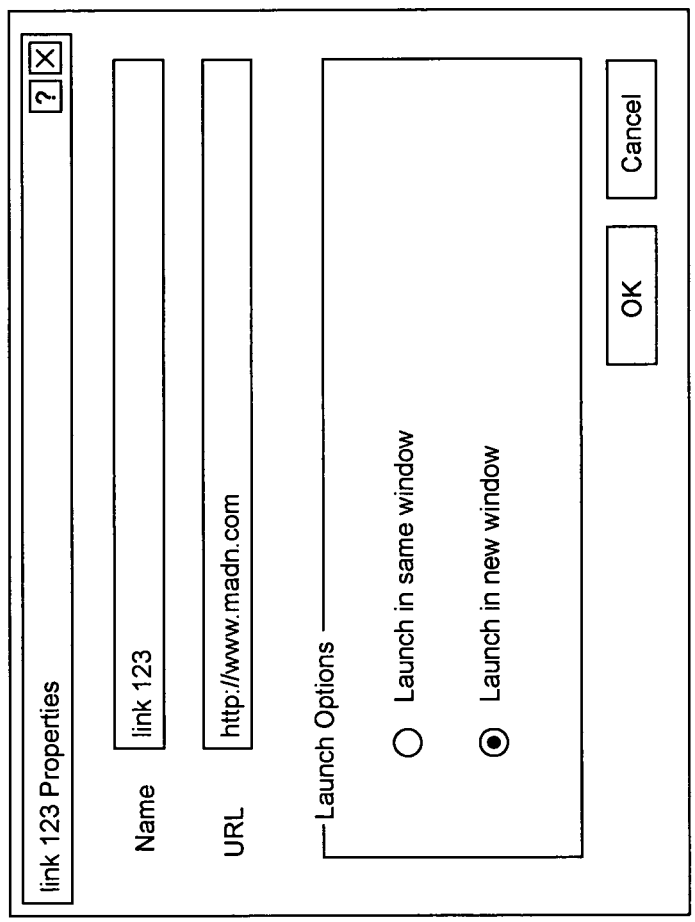
FIG. 14 is a screen display illustrating the properties of a link used in the navigational tree structure of FIG. 7.

Further information may be specified about the link "link 123" in the properties display screen of FIG. 14. In this case, the link is provided a name (here "link 123") and a URL address. The properties display screen of FIG. 14 includes an option to launch the link in the same or in a different window when the link is selected. Of course, it will be understood that the "link 123" of FIG. 14 is stored in and may be accessed through the related links folder 170 of FIG. 7 along with other links. As illustrated in and specified by the configuration screen of FIG. 13, the link "link 123" is associated with and provides information, an application, documentation or access to other information for the asset CR-2000 stored in the asset database folder 166 of FIG. 7. If desired, the related links in the related links folder 170 of the navigational tree 162 of FIG. 7 may provide information or access to other documentation or applications in any desired manner other than using URLs as indicated in FIG. 14.

It will be understood that the integrated tree of any of FIGS. 3, 4, 6 and 7 or an integrated navigational tree of any other form may be used to access information or data about any of the devices or plant entities referred to therein (with the information being accessed being data provided by the different applications within the process plant 10). Of course, the integrated navigational trees of FIGS. 3, 4, 6 and 7 may also be used to view more information about the entities depicted therein, to determine the source of data for the entities depicted therein, to launch applications for different entities depicted therein, or to perform other activities with respect to that data.

As noted above, the integrated navigational trees described herein may be configured in any number of manners to integrate the data from different data sources or applications within the process plant 10. Thus, in one case, as illustrated above with respect to FIGS. 3 and 7, different sections of the integrated navigational tree are primarily used for or related to the different applications or data sources providing data to the asset optimization database. As illustrated in FIG. 4, different sections of the integrated navigational tree are associated with the different logical parts or functions of the plant so that a different section of the tree exists for control, maintenance, rotating equipment, efficiency, etc. functions. In another case, as illustrated above with respect to FIG. 6, the devices or units associated with and present in different physical areas of the plant can be integrated together in a single section so that rotating equipment (typically measured by maintenance or rotating equipment applications) and valves (typically measured by control and maintenance applications) are placed together in one section or category of the navigational tree. Similarly, area data, unit data, equipment data, etc. from different applications may be integrated together within the same section or subsection of the integrated navigational tree.

Preferably, the integration application 86 is able to automatically read the navigational tree structures of the different applications to which it is to be attached and, upon mapping a particular tree element from an application into the integrated navigational tree, still keeps track of the original locations within application from which the data originated, to reflect changes that may take place automatically. In one example, the integration application 86 may automatically store data about devices within the integrated navigational tree with a data field indicating the original location of this device or data within the original field associated with the original application and with a data field indicting the location of this data in the integrated navigational tree. Thus, the source or original location of the data may be retrieved or used for any desired purpose.

If desired, the integration application 86 may store data in the database 82 indicating manner in which the components of a navigational tree of a known application are to be mapped to a default integrated navigational tree. This data enables this known application to be connected to the asset optimization server 62 and to send data to the asset optimization server without user input specifying the manner in which mapping from the navigational tree of the application into the integrated navigational tree is to occur. This data also enables a data source application to send plant data within its navigational tree without first sending the structure of the tree to the asset optimization server 62.

Alternatively, or in addition, the integration application 86 may have the ability to read the names of the branches of each plant tree of a data source application and create a section of the navigational tree within the integrated navigational tree with those names. Likewise, it is possible to have branches within the integrated navigational tree with the same names because these branches may be associated with different applications which use the same name for the branch. It is also possible to have different branch names within the integrated navigational tree to reflect or be associated with the same physical locations or entities of the plant, again because these different branches may be associated with different applications generating that data. Moreover, the same name or tag may be used for different devices or other plant entities within the integrated navigational tree as long as these names appear in different braches of the integrated navigational tree or are otherwise associated with different applications in the integrated navigational tree. Of course, different device tags and names may be used for the same device in the plant, if the same device is being monitored by different data source applications.

Furthermore, while the integration application 86 typically provides a default mapping between the navigational trees associated with the applications 60 and the integrated navigational tree 83b, the integration application 86 may enable users to re-map the tree components of the integrated navigational tree in any manner that the user desires using, for example, the screen display of FIG. 5. In this instance the integration application 86 may keep the original integrated navigational tree in memory and be able to bring the original integrated navigational tree back if the user desires to go back to the original state.

While the embodiment depicted in FIG. 2 hereof illustrates a single server for each of the different applications, it will be understood that more than one server may be provided in the plant 10 for any particular application and that these different servers may all provide data pertaining to a particular application to the asset optimization server 62 as different branches. Likewise, there may be multiple databases or plants associated with a particular application and the asset optimization server 62 may receive and integrate the data from these different databases in any desired manner.

While the integration application 86 of the asset optimization sever 62 and the other applications described herein are preferably implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a DVD) or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A data integration system for use in conjunction with a process plant having a plurality of data source applications, each of which collects or generates application data pertaining to entities within the process plant, the data integration system comprising:
    a database configured to store the application data pertaining to the entities within the process plant wherein the application data is collected or generated by the plurality of data source applications;
    an integration application stored on a computer readable memory and executable on a processor to create an integrated navigational tree for use in viewing or accessing the application data from the plurality of data source applications as stored in the database, the integrated navigational tree including categories for categorizing the application data from each of the plurality of data source applications, the categories displayed in the navigational tree as a hierarchy having a first level with at least one selectable element defining one or more physical plant device categories and a second level associated with the first level having one or more selectable indications defining one or more particular sub-categories of physical entities within the process plant that fall within the first level plant device category, wherein the integrated navigational tree is a single navigational tree and wherein data from different ones of the plurality of data source applications and associated with the first level plant device category is assessable by selecting different ones of the selectable indications of the second level; and
    a navigational tree memory configured to store the integrated navigational tree.

2. The data integration system of claim 1, wherein the categories of the integrated navigational tree include plant categories defined by the S88 standard.

3. The data integration system of claim 1, wherein the integration application includes a default navigational tree structure that specifies the categories for categorizing the application data and uses the default navigational tree structure to create the integrated navigational tree.

4. The data integration system of claim 1, wherein the categories of the integrated navigational tree include high-level categories defining each of the plurality of the data source applications and include sub-categories defined according to navigational trees associated with each of the plurality of data source applications.

5. The data integration system of claim 1, wherein the categories of the integrated navigational tree include logical function categories defining logical functions of the process plant.

6. The data integration system of claim 5, wherein the logical function categories include one or more of a device maintenance function, a device monitoring function, a control function, and a plant efficiency function.

7. The data integration system of claim 5, wherein the logical function categories include one or more of power equipment, field instrumentation equipment, rotating equipment and efficiency equipment.

8. The data integration system of claim 5, wherein the logical function categories include one or more of process areas, units, equipment, and control modules.

9. The data integration system of claim 1, further including a mapping application stored on a computer readable memory and executable on a processor to display depictions of the categories of the integrated navigational tree, to display depictions of data items associated with a navigational tree of one of the data source applications and to enable a user to specify a connection between the data items associated with the navigational tree of the one of the data source applications and the categories of the integrated navigational tree.

10. The data integration system of claim 9, wherein the mapping application enables a user to specify a connection between a particular data item associated with the navigational tree of the one of the data source applications and a particular category of the integrated navigational tree by selecting the depiction of the particular data item within the navigational tree of the one of the data source applications, dragging the depiction of the selected particular data item to the depiction of the particular category of the integrated navigational tree and dropping the depiction of the selected particular data item on the depiction of the particular category of the integrated navigational tree.

11. The data integration system of claim 10, wherein the depictions of the data items associated with the navigational tree of the one of the data source applications include depictions of categories of data associated with the navigational tree of the one of the data source applications.

12. The data integration system of claim 10, wherein the depictions of the data items associated with the navigational tree of the one of the data source applications include depictions of process entities associated with the navigational tree of the one of the data source applications.

13. The data integration system of claim 1, further including a data collection application stored on a computer readable memory and executable on a processor to receive the application data from each of the plurality of data source applications.

14. The data integration system of claim 13, wherein the data collection application is a web viewing application.

15. The data integration system of claim 1, wherein the integrated navigational tree includes a category for linking information that provides a link to information or to an application related to at least one of the entities within the process plant.

16. A web server system for use in conjunction with a process plant, comprising:
    a communication network;
    a data integration server communicatively connected to the communication network; and
    a plurality of application servers communicatively connected to the data integration server via the communication network, each application server adapted to serve data from a data source application which collects or generates application data pertaining to entities within the process plant to the data integration server;

the data integration server including;
- a processor,
- a computer readable program memory,
- a first database adapted to receive and to store the application data pertaining to the entities within the process plant collected or generated by the plurality of data source applications;
- an integration application stored on the computer readable program memory and adapted to be executed on the processor to create an integrated navigational tree for use in viewing or accessing the application data from the plurality of data source applications as stored in the first database, the integrated navigational tree including categories for categorizing the application data from each of the plurality of data source applications, the categories displayed in the navigational tree as a hierarchy having a first level with at least one selectable element defining one or more physical plant device categories and a second level associated with the first level having one or more selectable indications defining one or more particular sub-categories of physical entities within the process plant that fall within the first level plant device category, wherein the integrated navigational tree is a single navigational tree and wherein data from different ones of the plurality of data source applications and associated with the first level is assessable by selecting different ones of the selectable indications of the second level; and
- a navigational tree database configured to store the integrated navigational tree.

17. The web server system of claim 16, further including a user interface application configured display the integrated navigational tree to enable a user to view or access the application data stored in the first database.

18. The web server system of claim 17, wherein the user interface application is stored on the computer readable program memory and is executable on the processor of the data integration server.

19. The web server system of claim 16, wherein the categories of the integrated navigational tree include categories of a plant defined by an S88 standard.

20. The web server system of claim 16, wherein the integration application includes a default navigational tree structure that specifies the categories for categorizing the application data and uses the default navigational tree structure to create the integrated navigational tree.

21. The web server system of claim 16, wherein the categories of the integrated navigational tree include high-level categories defining each of the plurality of the data source applications and include sub-categories defined according to navigational trees associated with each of the plurality of data source applications.

22. The web server system of claim 16, wherein the categories of the integrated navigational tree include logical function categories defining logical functions of the process plant.

23. The web server system of claim 22, wherein the logical function categories include one or more of a device maintenance function, a device monitoring function, a control function, and a plant efficiency function.

24. The web server system of claim 22, wherein the logical function categories include one or more of power equipment, field instrumentation equipment, rotating equipment and efficiency equipment.

25. The web server system of claim 16, further including a mapping application stored on the computer readable program memory and executable on the processor to display depictions of the categories of the integrated navigational tree, to display depictions of data items associated with a navigational tree of one of the data source applications and to enable a user to specify a connection between the data items associated with the navigational tree of the one of the data source applications and the categories of the integrated navigational tree.

26. The web server system of claim 25, wherein the mapping application enables a user to specify a connection between a particular data item associated within the navigational tree of the one of the data source applications and a particular category of the integrated navigational tree by selecting the depiction of the particular data item within the navigational tree of the one of the data source applications, dragging the depiction of the selected particular data item to the depiction of the particular category of the integrated navigational tree and dropping the depiction of the selected particular data item on the depiction of the particular category of the integrated navigational tree.

27. The web server system of claim 26, wherein the depictions of the data items associated with the navigational tree of the one of the data source applications include depictions of categories of data associated with the navigational tree of the one of the data source applications.

28. The web server system of claim 16, wherein the integrated navigational tree includes a category for linking information that provides a link to information or to an application related to at least one of the entities within the process plant.

29. A method of integrating application data pertaining to entities within a process plant collected or generated by a plurality of data source applications associated with the process plant, the method comprising:
- storing the application data pertaining to the entities within the process plant in a first database, the application data collected or generated by the plurality of data source applications;
- creating an integrated navigational tree for use in viewing or accessing the application data from the plurality of data source applications as stored in the first database, the integrated navigational tree including categories for categorizing the application data from each of the plurality of data source applications, the categories displayed in the navigational tree as a hierarchy having a first level with at least one selectable element defining one or more physical plant device categories and a second level associated with the first level having one or more selectable indications defining one or more particular sub-categories of physical entities within the process plant that fall within the first level plant device category, wherein data from different ones of the plurality of data source applications and associated with the first level is assessable by selecting different ones of the selectable indications of the second level;
- storing the integrated navigational tree in a memory; and
- displaying the integrated navigational tree to enable a user to view or access the application data stored in the first database, to thereby enable a user to access data generated by each of the different data source applications using a single navigational tree structure.

30. The method of claim 29, wherein the step of creating the integrated navigational tree includes creating categories of the integrated navigational tree defined by the S88 standard.

31. The method of claim 29, wherein creating the integrated navigational tree includes storing a default navigational tree structure that specifies the categories for categorizing the application data and using the default navigational tree structure to create the integrated navigational tree.

32. The method of claim 29, wherein the step of creating the integrated navigational tree includes creating high-level categories of the integrated navigational tree for each of the plurality of the data source applications and creating subcategories associated with the high-level categories defined according to navigational trees associated with each of the plurality of data source applications.

33. The method of claim 29, wherein the step of creating the integrated navigational tree includes creating categories of the integrated navigational tree to include logical function categories defining logical functions of the process plant.

34. The method of claim 33, wherein the logical function categories include one or more of a device maintenance function, a device monitoring function, a control function, and a plant efficiency function.

35. The method of claim 33, wherein the logical function categories include one or more of power equipment, field instrumentation equipment, rotating equipment and efficiency equipment.

36. The method of claim 33, wherein the logical function categories include one or more of process areas, units, equipment, and control modules.

37. The method of claim 29, further including displaying depictions of the categories of the integrated navigational tree, displaying depictions of data items associated with a navigational tree of one of the data source applications and enabling a user to specify a connection between a particular data item associated with the navigational tree of the one of the data source applications and a particular category of the integrated navigational tree.

38. The method of claim 37, wherein the step of enabling a user to specify a connection between the particular data item associated within the navigational tree of the one of the data source applications and the particular category of the integrated navigational tree includes enabling a user to select the depiction of the particular data item within the navigational tree of the one of the data source applications, enabling the user to drag the depiction of the selected particular data item to the depiction of the particular category of the integrated navigational tree and enabling the user to drop the depiction of the selected particular data item on the depiction of the particular category of the integrated navigational tree.

39. The method of claim 29, further including the step of automatically sending the application data from each of the plurality of data source applications to the first database.

40. The method of claim 29, wherein creating the integrated navigational tree includes creating the integrated navigational tree to include a category for linking information that provides a link to information or to an application related to at least one of the entities within the process plant.

41. The method of claim 40, wherein the link is a universal resource locator (URL).

42. The data integration system of claim 1, further including a user interface application stored on a computer readable memory and executable on a processor to display the integrated navigational tree to enable a user to view or access the application data stored in the database.

43. The data integration system of claim 1, wherein the at least one of the categories or indications of the entities of the integrated navigational tree identifies a control routine.

44. The data integration system of claim 1, wherein the at least one of the categories or indications of the entities of the integrated navigational tree identifies field equipment.

45. The data integration system of claim 1, wherein the at least one of the categories or indications of the entities of the integrated navigational tree identifies an area of the process plant.

46. The data integration system of claim 1, wherein the at least one of the categories or indications of the entities of the integrated navigational tree identifies an equipment module of the process plant.

47. The data integration system of claim 1, wherein the at least one of the categories or indications of the entities of the integrated navigational tree identifies a control module of the process plant.

48. The data integration system of claim 1, wherein the at least one of the categories or indications of the entities of the integrated navigational tree identifies a unit of the process plant, wherein the unit identifies a particular grouping of plant equipment hardware.

49. The data integration system of claim 1, wherein the at least one of the categories or indications of the entities of the integrated navigational tree identifies a type of device used in the process plant.

50. The data integration system of claim 49, wherein the type of device used in the process plant includes one of a pump, a fan, a motor, a dryer, a compressor or a heat exchanger.

* * * * *